UNITED STATES PATENT OFFICE.

AUGUST STOCK, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

KETONE SULFOXYLATE AND PROCESS OF MAKING SAME.

No. 909,703.

Specification of Letters Patent.

Patented Jan. 12, 1909.

Application filed March 6, 1906. Serial No. 304,455. (Specimens.)

*To all whom it may concern:*

Be it known that I, AUGUST STOCK, Ph. D., chemist, a citizen of the Empire of Germany, and residing at Höchst-on-the-Main, Germany, have invented certain new and useful Improvements in Ketone Sulfoxylates and Processes of Making Same, of which the following is a specification.

I have found that ketonesulfoxylates, compounds of the salts of sulfoxylic acid (compare Ber. d. D. Chem. Ges. 38, 1051, below) with ketones, may be obtained, if compounds containing ketones and sulfurous acid be treated with reducing agents as long as an increase of the reducing power towards an indigo sulfonic acid solution can be ascertained.

The compounds suitable for the process are the following: 1. Ketone bisulfites. 2. Ketone sulfurous acid, that is, a solution of a ketone and of sulfurous acid in a suitable solvent. 3. Ketone hydrosulfites; they consist of ketone bisulfite and ketonesulfoxylate, analogous to the formaldehyde hydrosulfites (compare Ber. d. D. Chem. Ges. 38, 1052). As reducing agents are best suited zinc dust or iron in presence or absence of an acid.

The reaction will proceed without heating, but is accelerated at a moderately raised temperature, although temperatures above 70° C. are to be avoided, as otherwise the ketonesulfoxylate is decomposed. The formation of the ketonesulfoxylates is represented by the following formula:

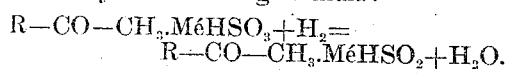

Contrary to the known formaldehyde sulfoxylates, the ketonesulfoxylates reduce a solution of indigo sulfonic acid even in the cold; they reduce for 32 grams of the sulfur contained therein more than 131 grams of indigo and are capable of producing a white discharge on fabrics dyed naphthylamin bordeaux. For discharging purposes are to be considered the sodium salts, especially the acetone sodium sulfoxylate. These sodium salts are colorless bodies, readily soluble in water, soluble with difficulty in alcohol, insoluble in benzene. Besides the salts mentioned in the foregoing formula basic salts exist, of which zinc and calcium salts are soluble with difficulty in water. The ketonesulfoxylates become decomposed by acids, while sulfur dioxid is evolved and sulfur eliminated.

Example I.—To a solution of 520 parts of sodium bisulfite of 40° Baumé in 500 parts of water are added 130 parts of acetone; 200 parts of zinc dust stirred with little water are then introduced and the mass is heated to 50–60° C. as long as an increase of the reducing power towards a solution of indigo sulfonic acid can be ascertained. It is then cooled, filtered and evaporated in a vacuum. The reaction may be accelerated by adding a zinc salt, for instance, zinc chlorid.

Example II.—To a solution of 520 parts of sodium bisulfite of 40 Bé. in 500 parts of water are added 130 parts of acetone and 200 parts of iron powder. The mixture is heated to 30° C. and at this temperature 1000 parts of dilute sulfuric acid containing 196 parts of $H_2SO_4$ are slowly run in. Half an hour after introducing all, acid sodium carbonate is added until the reaction is feebly alkaline and the solution of the acetone sodium sulfoxylate is filtered from the iron mud. In this example, for the sulfuric acid may be substituted the equivalent quantity of another acid, for instance, acetic acid.

Example III.—To 1000 parts of a solution of zinc bisulfite, containing 114 parts thereof are added 65 parts of acetone. 120 parts of zinc dust are then introduced while stirring and the whole is heated for 6 hours to 50° C. Sodium carbonate is then added until the reaction is fully alkaline and the solution is filtered from the separated zinc carbonate. By evaporating in a vacuum, sodium acetone sulfoxylate is obtained in solid form.

Example IV.—To 1000 parts of a solution of zinc hydrosulfite containing 193 parts of $ZnS_2O_4$ are added 130 parts of acetone and after the latter has reacted on the hydrosulfite the whole is heated with 120 parts of zinc dust to 50° C. for 6 hours. An addition of some zinc chlorid is of advantage. The further working up of the product of the reaction is conducted as in Example III.

Example V.—Into a solution of 65 parts of acetone in 1000 parts of water are introduced 64 parts of sulfur dioxid. 120 parts of zinc dust are then added while well stirring and cooling and if no further spontaneous heating occurs the temperature is raised to 50–60° C. After 6 hours sodium carbonate is added and the operation continued as in Example II. In this example, for acetone may be substituted an equivalent quantity of another ketone, for instance, methylethylketone.

Having thus described my invention, I claim as new and desire to secure by Letters Patent:

1. The herein described process of making ketonesulfoxylates, which consists in treating compounds containing ketone and sulfurous acid with reducing agents at a temperature below 70° C.

2. As new products, the herein described ketonesulfoxylates having the formula $R-CO-CH_2.M\acute{e}HSO_2$ (in which R is a monovalent hydrocarbon radical and Mé is a monovalent metal), the sodium-salt of which is a nearly white crystalline substance, soluble in cold water, and which has the power of reducing solutions of indigo, substantially as described.

In testimony, that I claim the foregoing as my invention, I have signed my name in presence of two subscribing witnesses.

AUGUST STOCK.

Witnesses:
JEAN GRUND,
CARL GRUND.